US012647395B2

(12) United States Patent (10) Patent No.: US 12,647,395 B2
Gubanov et al. (45) Date of Patent: Jun. 2, 2026

(54) FIREWALLS AUTOMATIC RULES CREATION FROM STEALTHWATCH DATA

(71) Applicant: Cisco Technology, Inc., San Jose, CA (US)

(72) Inventors: Nikolai Gubanov, Alges (PT); Hugo Amaro, Caparica (PT); Ahmed Abdelmawgoud, Riyadh (SA); Vitor Leitao, Amadora (PT)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 18/493,026

(22) Filed: Oct. 24, 2023

(65) Prior Publication Data

US 2025/0133061 A1 Apr. 24, 2025

(51) Int. Cl.
*H04L 9/40* (2022.01)
*G06F 12/0813* (2016.01)
*H04L 41/0813* (2022.01)

(52) U.S. Cl.
CPC ...... *H04L 63/0263* (2013.01); *G06F 12/0813* (2013.01); *H04L 41/0813* (2013.01); *H04L 63/0218* (2013.01); *H04L 63/0245* (2013.01); *H04L 63/0236* (2013.01); *H04L 63/10* (2013.01)

(58) Field of Classification Search
CPC ............. H04L 63/0263; H04L 41/0813; H04L 63/0218; H04L 63/0245; H04L 63/0236; H04L 63/10; G06F 12/0813
See application file for complete search history.

(56) References Cited

U.S. PATENT DOCUMENTS

| | | | |
|---|---|---|---|
| 2012/0216270 A1 | 8/2012 | Anderson et al. | |
| 2012/0317050 A1* | 12/2012 | Bermuth ................ | G06Q 10/06 |
| | | | 705/348 |
| 2014/0245423 A1* | 8/2014 | Lee ......................... | H04L 63/20 |
| | | | 726/12 |
| 2018/0007008 A1* | 1/2018 | Bansal ................ | G06F 12/0813 |
| 2018/0054418 A1* | 2/2018 | El Defrawy ........... | H04L 63/10 |
| 2019/0173736 A1 | 6/2019 | Ponnuswamy et al. | |
| 2021/0084013 A1* | 3/2021 | Mutnuru ............. | H04L 41/0894 |
| 2023/0104129 A1* | 4/2023 | Miriyala ................. | H04L 69/03 |
| | | | 709/220 |
| 2023/0114050 A1* | 4/2023 | Cai ....................... | H04L 41/145 |
| | | | 726/11 |
| 2023/0164117 A1* | 5/2023 | Wu ......................... | H04L 63/20 |
| | | | 726/1 |

* cited by examiner

*Primary Examiner* — Cheng-Feng Huang

(74) *Attorney, Agent, or Firm* — Polsinelli P.C.

(57) ABSTRACT

In one aspect, a method for automated creation and management of firewall rules in a network environment, includes obtaining network traffic patterns including data exported from one or more network appliances in the network environment, where the data includes a plurality of network identifiers, automatically generating a first set of firewall rules based on a source and destination of each network identifier, automatically generating a second set of firewall rules based on firewall data including a source and destination of address, and generating a revised set of firewall rules based on the first set of firewall rules and the second set of firewall rules, where the revised set of firewall rules is also based on a detection of a number of times at least one of the second set of rules is invoked at the firewall.

20 Claims, 7 Drawing Sheets

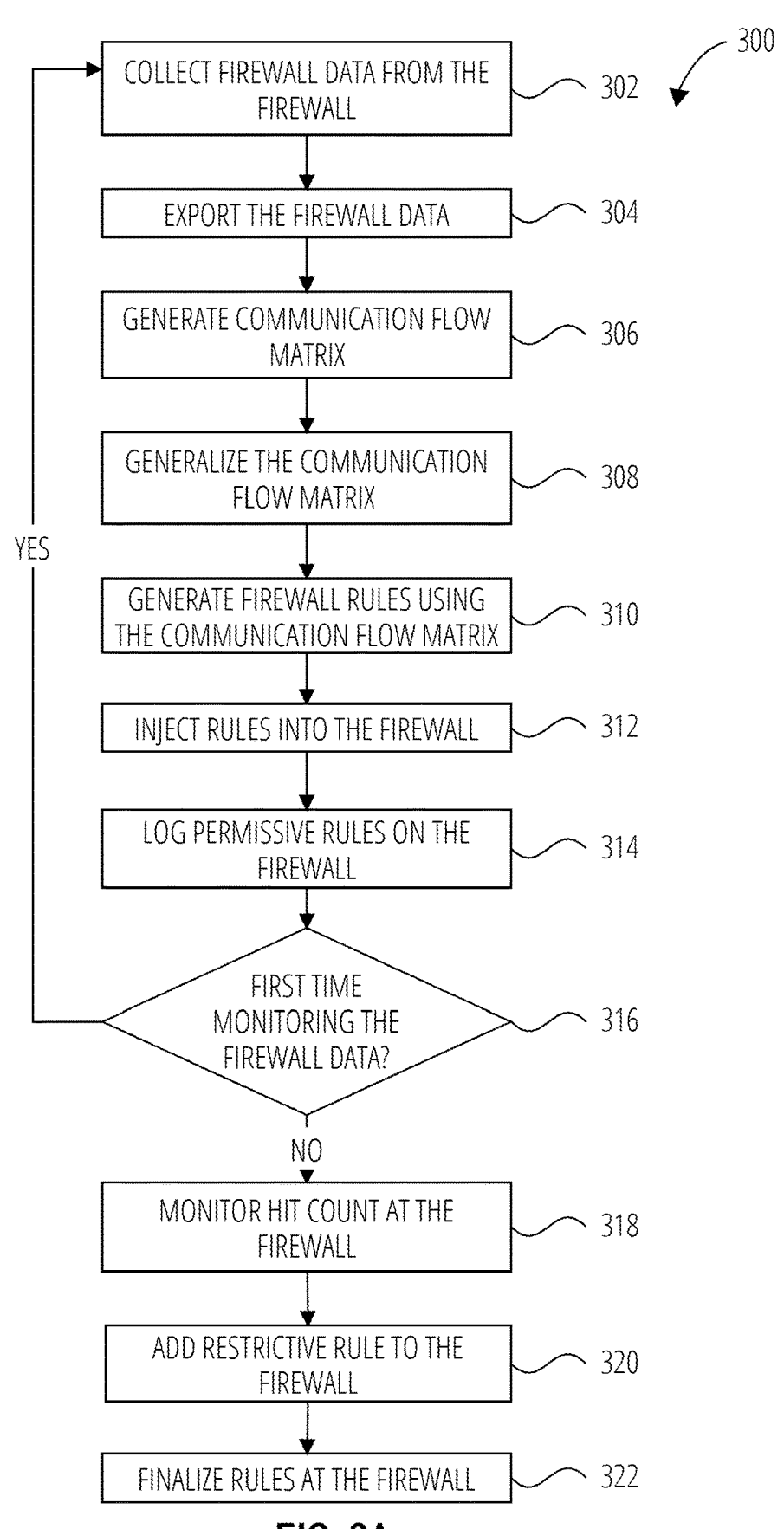

300

COLLECT FIREWALL DATA FROM THE FIREWALL — 302

EXPORT THE FIREWALL DATA — 304

GENERATE COMMUNICATION FLOW MATRIX — 306

GENERALIZE THE COMMUNICATION FLOW MATRIX — 308

YES

GENERATE FIREWALL RULES USING THE COMMUNICATION FLOW MATRIX — 310

INJECT RULES INTO THE FIREWALL — 312

LOG PERMISSIVE RULES ON THE FIREWALL — 314

FIRST TIME MONITORING THE FIREWALL DATA? — 316

NO

MONITOR HIT COUNT AT THE FIREWALL — 318

ADD RESTRICTIVE RULE TO THE FIREWALL — 320

FINALIZE RULES AT THE FIREWALL — 322

FIG. 3A

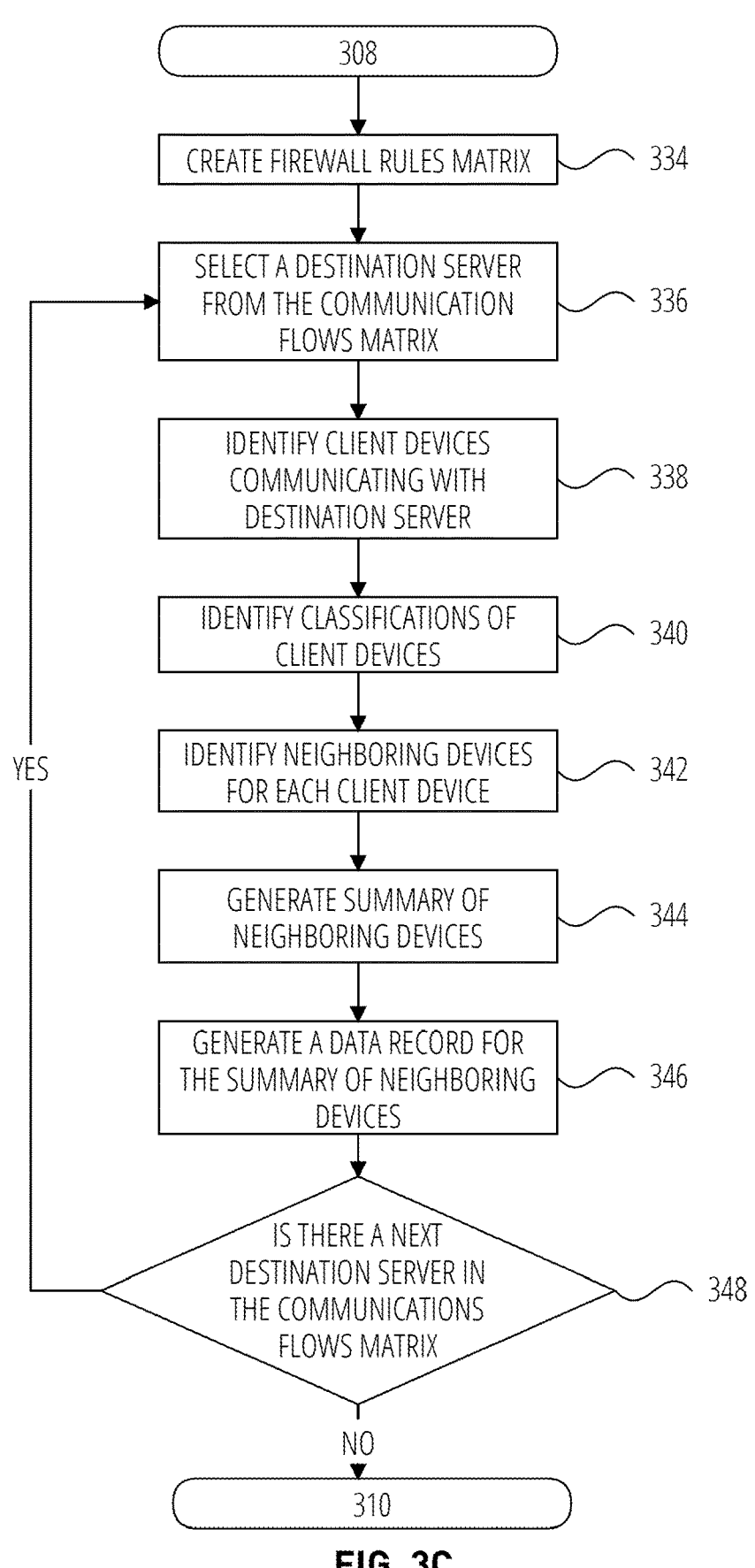

308

CREATE FIREWALL RULES MATRIX — 334

SELECT A DESTINATION SERVER FROM THE COMMUNICATION FLOWS MATRIX — 336

IDENTIFY CLIENT DEVICES COMMUNICATING WITH DESTINATION SERVER — 338

IDENTIFY CLASSIFICATIONS OF CLIENT DEVICES — 340

IDENTIFY NEIGHBORING DEVICES FOR EACH CLIENT DEVICE — 342

GENERATE SUMMARY OF NEIGHBORING DEVICES — 344

GENERATE A DATA RECORD FOR THE SUMMARY OF NEIGHBORING DEVICES — 346

IS THERE A NEXT DESTINATION SERVER IN THE COMMUNICATIONS FLOWS MATRIX — 348

YES

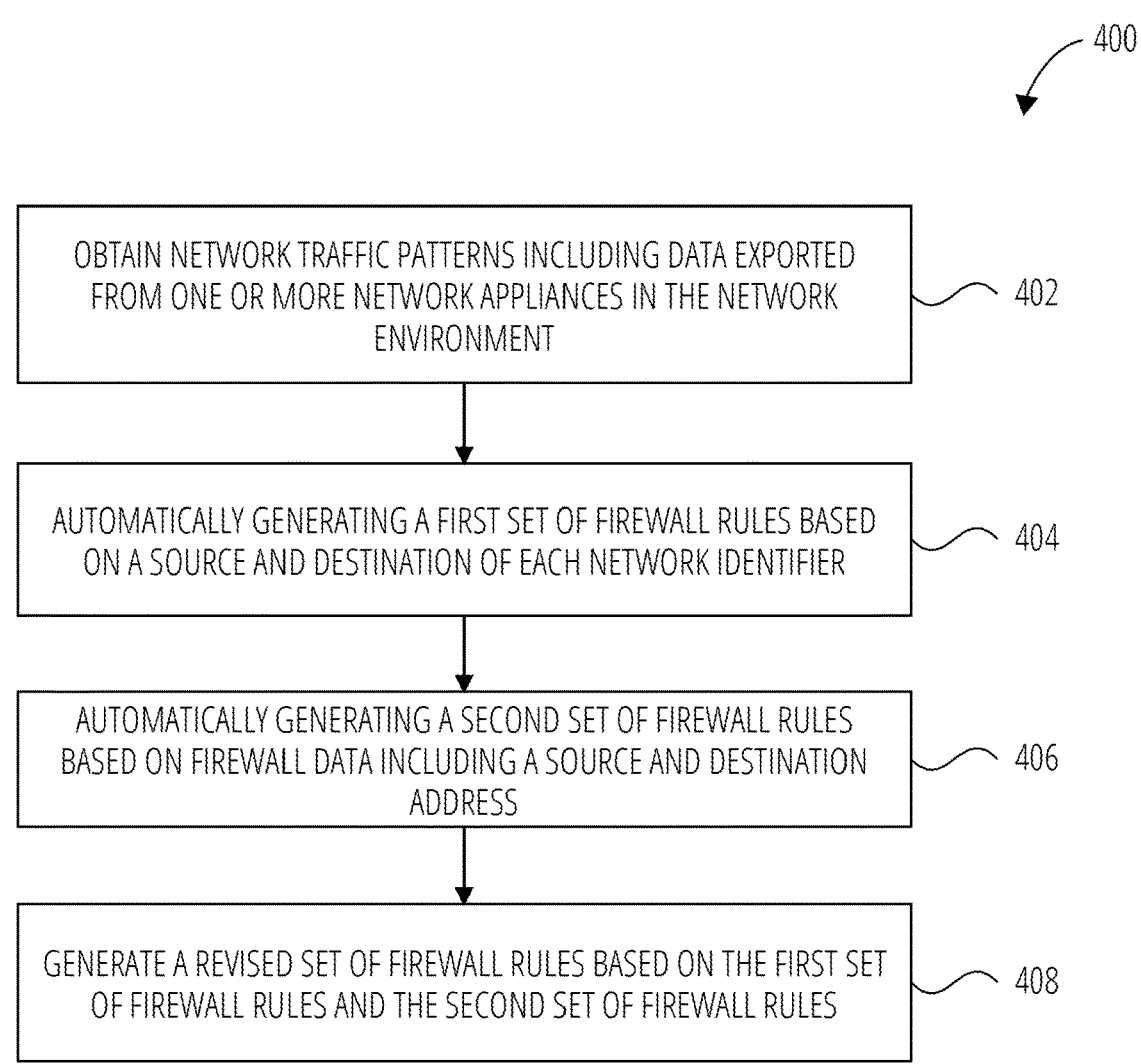

400

OBTAIN NETWORK TRAFFIC PATTERNS INCLUDING DATA EXPORTED FROM ONE OR MORE NETWORK APPLIANCES IN THE NETWORK ENVIRONMENT — 402

AUTOMATICALLY GENERATING A FIRST SET OF FIREWALL RULES BASED ON A SOURCE AND DESTINATION OF EACH NETWORK IDENTIFIER — 404

AUTOMATICALLY GENERATING A SECOND SET OF FIREWALL RULES BASED ON FIREWALL DATA INCLUDING A SOURCE AND DESTINATION ADDRESS — 406

GENERATE A REVISED SET OF FIREWALL RULES BASED ON THE FIRST SET OF FIREWALL RULES AND THE SECOND SET OF FIREWALL RULES — 408

FIG. 4

FIREWALLS AUTOMATIC RULES CREATION FROM STEALTHWATCH DATA

FIELD OF THE TECHNOLOGY

The present technology generally pertains to the field of cybersecurity within network environments. Specifically, the present technology relates to a method for automating the creation and management of firewall rules in a network environment.

BACKGROUND

An increase in malicious attacks on networks gives rise to various challenges to ensure secure and effective communication between devices in a network. With increasing numbers of devices and access points on the network, comprehensive security strategies benefit from defenses at multiple layers of depth, with security layered across the network, the server, and the endpoints. Intrusion prevention systems can monitor a network for malicious or unwanted activity and can react, in real time, to block, deny or prevent those activities.

As data breaches, cyberattacks, and unauthorized access continue to pose significant threats, the need for robust firewall protection has become increasingly evident. Firewalls represent a critical line of defense against malicious actors seeking to compromise network integrity, data confidentiality, and system functionality.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3A illustrates an example routine for automated creation and management of firewall rules by a threat management system according to some embodiments of the present technology.

FIG. 3C illustrates an example routine for generalizing the communication flow matrix according to some embodiments of the present technology.

FIG. 4 illustrates a process 400 according to some embodiments of the present technology.

DETAILED DESCRIPTION

Figure 1:
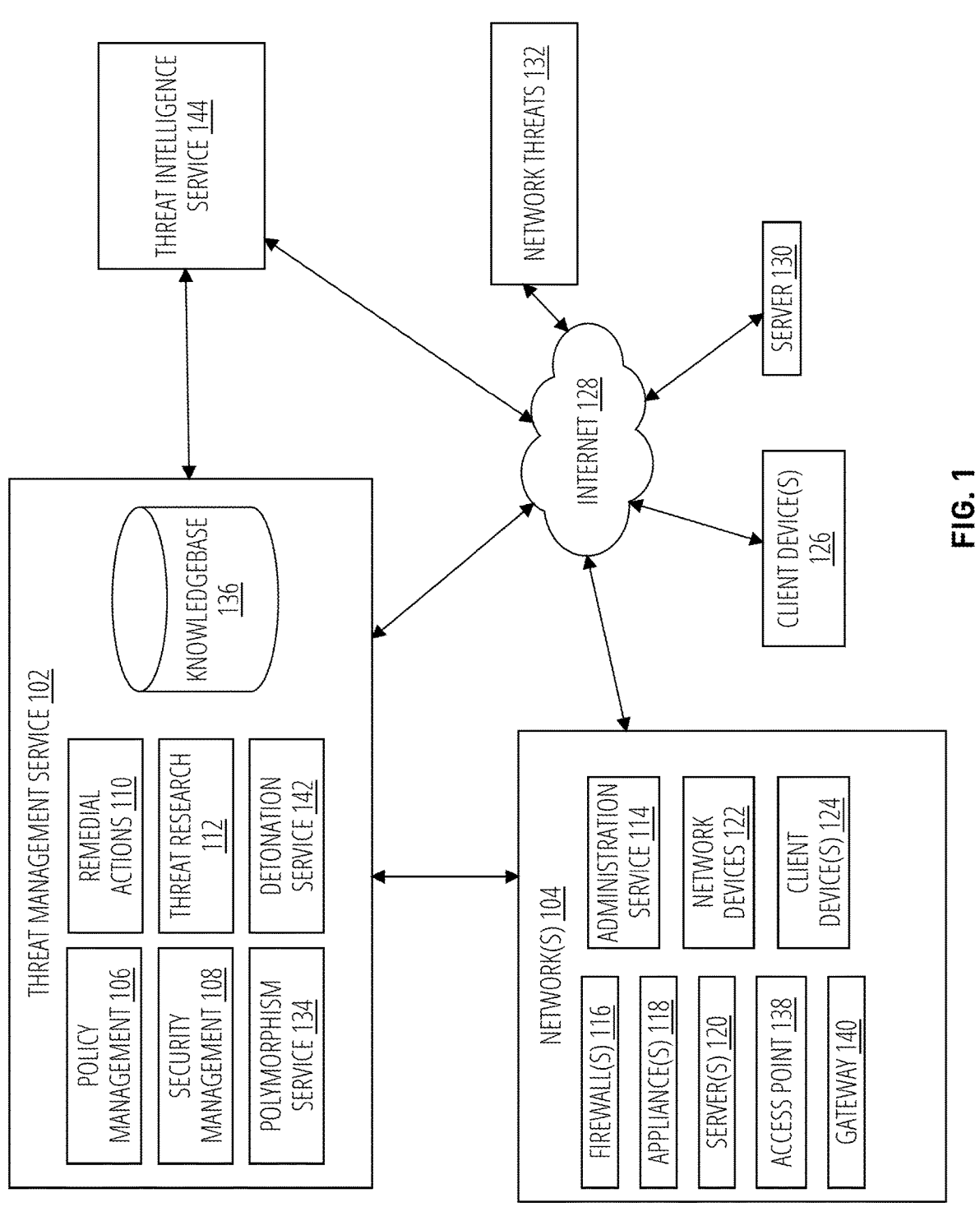
FIG. 1 illustrates an example threat management system according to some embodiments of the present technology.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Traditionally, firewall management involves the labor-intensive process of manually configuring rules and policies, which often leads to errors, omissions, and delayed responses to emerging threats. At its core, firewall management involves the establishment and maintenance of firewall rules and policies, which dictate the flow of network traffic and determine what is allowed, denied, or monitored. Continual monitoring of network traffic is imperative in firewall management. Vigilance ensures the timely detection and response to any suspicious or unauthorized activities that may threaten the network's security. Monitoring involves the meticulous analysis of logs and alerts generated by the firewall, allowing for the swift identification and mitigation of potential security breaches.

Moreover, firewall management demands a proactive approach to maintaining the firewall's effectiveness. The proactive approach includes keeping the firewall software or hardware up-to-date with the latest security patches and updates, a practice crucial for addressing vulnerabilities promptly. Regular reviews and refinements of firewall rules and policies are also essential to adapt to evolving network requirements and emerging threats, striking the right balance between security and network performance. Additionally, firewall management encompasses well-defined incident response procedures. The incident response procedures are designed to handle security incidents or breaches promptly. The incident response procedures may entail isolating compromised systems or blocking malicious traffic. Furthermore, robust logging and reporting practices are essential to maintain comprehensive records of firewall activities, generating reports for auditing, compliance, and in-depth analysis.

Automation of firewall management as presented herein allows organizations to be more proactive in their detection approach of known and unknown cyberthreats.

Configuration of the firewall stands as the foundational pillar of firewall management, as it involves setting up rules and policies that govern the behavior of the firewall. Criteria such as source and destination IP addresses, ports, protocols, and application types guide the decision-making process for permitted and denied traffic. Configuration is the initial step in fortifying network security through the firewall. Once configured, the firewall is continuously monitored to ensure its effectiveness in safeguarding the network. This monitoring encompasses real-time examination of network traffic and firewall logs, enabling the timely detection and response to suspicious or unauthorized activities. Oftentimes security professionals manually analyze these logs to identify intrusion attempts, abnormal traffic patterns, or potential security breaches, thus reinforcing the network's overall security posture. By maintaining a proactive approach to system updates and patch management, the firewall can stay current with the latest security patches and updates is vital to addressing vulnerabilities promptly and fortifying the firewall against emerging threats. Regular updates to the firewall ensure its resilience and adaptability to evolving security challenges.

Regularly reviewing and refining firewall rules is crucial in firewall management as networks and threats are constantly evolving. This iterative optimization process ensures that the firewall maintains the appropriate balance between security and network performance, accommodating changing network requirements and emerging security risks.

The present disclosure is directed towards enhancing and automating the generation of firewall rules and policies by analyzing information received from network flows encountered by the firewall, and developing a fully automating the rules and policy generation process. The present disclosure provides an algorithm that facilitates the generation of firewall rules and policies by extracting data from both the traffic monitoring system and the firewall itself. This data-driven approach allows for the creation of rules that specifically correspond to the interactions between various applications on the network. Notably, the created rules are characterized by their precision and efficiency, owing to their generalized nature. By analyzing application interactions and leveraging the data obtained from the monitoring system and firewall, the algorithm can formulate rules that finely tune network security, ensuring that only authorized and legitimate application interactions are permitted while efficiently mitigating potential threats or undesirable traffic, thus enhancing the overall security posture of the network.

In one aspect, a method for automated creation and management of firewall rules in a network environment, includes obtaining network traffic patterns including data exported from one or more network appliances in the network environment, where the data includes a plurality of network identifiers, automatically generating a first set of firewall rules based on a source and destination of each network identifier, automatically generating a second set of firewall rules based on firewall data including a source and destination address, and generating a revised set of firewall rules based on the first set of firewall rules and the second set of firewall rules, where the revised set of firewall rules is also based on a detection of a number of times at least one of the second set of rules is invoked at the firewall.

In another aspect, the method may also include where generating the second set of firewall rules includes automatically modifying or removing existing firewall rules in the first set of firewall rules based on real-time network activity and threat intelligence data at the firewall.

In another aspect, the method may also include further includes injecting the second set of firewall rules in the network environment, where the injecting includes associating each firewall rule in the second set of firewall rules with specific network identifiers and a corresponding zone of origination.

In another aspect, the method may also include where each zone of origination represents distinct network segments or domains within the network environment, facilitating an identification of one or more correlations between zones of origination of the firewall data associated with each network identifier received at the firewall.

In another aspect, the method may also include where each network identifier identifies a source network appliance and destination network appliance of each network identifier that is associated with the generated first set of firewall rules.

In another aspect, the method may also include further includes automatically modifying the first set of firewall rules, to remove one or more of firewall rules in the first set of firewall rules to generate the second set of firewall rules based on real-time network activity and threat intelligence data received at the firewall.

In another aspect, the method may also include further includes monitoring the network traffic patterns to detect when incoming or outgoing network traffic matches one or more conditions specified in one or more firewall rules from the first set of firewall rules, generating an invocation event upon detection of said matching network traffic, the invocation event configured to trigger an automatic modification of the first set of firewall rules.

In another aspect, the method may also include where the exported data received from network appliances in the network environment includes network identifiers selected from the group consisting of MAC addresses, IP addresses, domain names, hostnames, and port numbers.

In one aspect, a network device includes one or more memories having computer-readable instructions stored therein. The network device also includes one or more processors configured to execute the computer-readable instructions to obtain network traffic patterns including data exported from one or more network appliances in a network environment, where the data includes a plurality of network identifiers, automatically generate a first set of firewall rules based on a source and destination of each network identifier, automatically generate a second set of firewall rules based on firewall data including a source and destination address, and generate a revised set of firewall rules based on the first set of firewall rules and the second set of firewall rules, where the revised set of firewall rules is also based on a detection of a number of times at least one of the second set of rules is invoked at the firewall.

In one aspect, a non-transitory computer-readable storage medium includes computer-readable instructions, which when executed by one or more processors of a network appliance, cause the network appliance to obtain network traffic patterns including data exported from one or more network appliances in a network environment, where the data includes a plurality of network identifiers, automatically generate a first set of firewall rules based on a source and destination of each network identifier, automatically generate a second set of firewall rules based on firewall data including a source and destination address, and generate a revised set of firewall rules based on the first set of firewall rules and the second set of firewall rules, where the revised set of firewall rules is also based on a detection of a number of times at least one of the second set of rules is invoked at the firewall.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Example Embodiments

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Firewall management is the cornerstone of network security, encompassing the configuration, monitoring, and maintenance of firewall devices or software to shield networks from potential threats. By skillfully defining and enforcing firewall rules and policies, organizations can control the flow of network traffic, allowing authorized data transmissions while impeding unauthorized access and malicious activities. Effective firewall management is instrumental in maintaining network integrity and safeguarding sensitive data, ensuring that security protocols align with evolving cyberthreats.

However, managing firewalls in complex networks presents several formidable challenges. In intricate network environments, the sheer volume of rules and policies can become unwieldy, creating challenges to maintain an accurate and up-to-date configuration. Moreover, balancing stringent security measures with the need for optimal network performance can be intricate, often necessitating delicate trade-offs. Coordinating firewall management across multiple devices and locations adds another layer of complexity, demanding centralized control and policy consistency. Additionally, the dynamic nature of modern threats requires continuous vigilance and prompt updates, straining resources and demanding a proactive stance against evolving cybersecurity risks. These challenges underscore the significance of innovative approaches and advanced technologies in firewall management within complex network ecosystems.

In the realm of network security, effective firewall management plays a pivotal role in safeguarding network integrity and data assets. The present disclosure aims to strengthen network defenses against cyberthreats by utilizing innovative firewall rules and policies to prevent unauthorized access. Through the meticulous configuration of firewall rules, this technology allows for precise control over network traffic, permitting or denying access based on predefined criteria such as source and destination addresses, ports, protocols, and application types. The firewall rules, when seamlessly integrated into comprehensive firewall policies, create a robust security framework capable of thwarting diverse cyberthreats. By systematically managing the interactions between networked systems and external entities, this technology ensures that only legitimate and authorized connections are established, thus bolstering network security and resilience against cyberattacks.

By leveraging advanced algorithms and data-driven insights, automated systems can efficiently formulate and implement firewall rules tailored to specific network requirements and threat landscapes. The presently presented automation streamlines the traditionally complex and time-consuming process of rule creation, allowing organizations to respond rapidly to evolving security needs and emerging threats. It enables real-time adaptability, ensuring that network configurations remain agile and responsive to changing conditions, ultimately bolstering the network's resilience against cyber threats.

Furthermore, the automation of firewall rule creation and management significantly improves existing manual processes. Manual rule management is often prone to errors, misconfigurations, and oversights, which can introduce security vulnerabilities. Automation mitigates risks by consistently enforcing security policies and ensuring that rules adhere to best practices. This not only enhances security but also optimizes operational efficiency. By reducing the need for manual intervention in rule creation and updates, IT and security teams can allocate their time and expertise to more strategic and high-value security tasks, such as threat analysis and incident response. Overall, automation empowers organizations to maintain a robust security posture while simultaneously streamlining and enhancing firewall management processes.

FIG. 1 illustrates an environment for threat management. Specifically, FIG. 1 depicts a block diagram of a threat management service 102 providing protection to one or more enterprises, networks, locations, users, businesses, etc., against a variety of threats. The threat management service 102 may be used to protect devices (e.g., IoT devices, appliances, services, client devices, or other devices) from computer-generated and human-generated threats.

The threat management service 102 is a malware analysis platform that discovers, identifies, analyzes, and tracks sophisticated threats. Threat management service 102 provides an end-to-end workflow from intelligence gathering to multi-vector analysis, threat hunting, and response, resulting in real-time visibility into malicious behavior associated with known and unknown malware.

The threat management service 102 can perform dynamic sandboxing of suspicious files, control flow graph analysis, and memory scanning for detecting malicious activity. The threat management service 102 can accelerate the hunting and finding of threats by providing context for suspicious files, including the behavior of known threats that are tracked across various networks in order to identify associated malware campaigns.

In order to track threats, the threat management service 102 uses a combination of static analysis to examine code and look for telltale indicators that can indicate the presence of malicious code. As well as dynamic analysis to examine how the code behaves when executed. This allows the threat management service 102 to accurately identify samples of malware even if changed in form but not in function or modified to be difficult for humans or computers to understand (obfuscated).

As explained herein the threat management service 102 further uses detection of both Signature characterization and Behavioral characterizations to identify code as malicious or malware. Signature characterization detection works by scanning for known malware, relying on a database of known threats worldwide and their signatures. Behavioral characterization detection looks at how the code behaves when executed, allowing the threat management service 102 to detect unknown or newly created malware.

During detection, the threat management service 102 will look at the code, metadata, download history, and other information associated with the threat to determine whether or not the threat is malicious. If the threat is determined to be malicious, then the threat management service 102 will create a report that includes detailed information about the threat, such as its origin, type, risk level, and other related characteristics. Additionally, the report may contain indicators that can help identify the malware's spreading patterns and networks used to host the malicious content. The report can further provide any associated user actions or events occurring before the system detected the threat.

The report and analysis in threat management service 102 can further produce a variety of malware resolutions and solutions, such as blocking malicious URLs, killing malicious processes, quarantining affected files and systems, and disabling malicious services. Additionally, the threat management service 102 can provide suggestions on how to improve an organization's security posture or alert administrators to new threats.

The threat of malware or other compromises may be present at various points within a network 104 such as client devices 124, server 130, gateways 140, IoT devices, appliances 118, firewalls 116, etc. In addition to controlling or stopping malicious code, the threat management service 102 may provide policy management to control devices, applications, or user accounts that might otherwise undermine the productivity and network performance within the network 104.

The threat management service 102 may provide protection to network 104 from computer-based malware, including viruses, spyware, adware, trojans, intrusion, spam, policy abuse, advanced persistent threats, uncontrolled access, and the like. The network 104 may be any networked computer-based infrastructure or the like managed by the threat management service 102, such as an organization, association, institution, or the like, or a cloud-based service. For example, the network 104 may be a corporate, commercial, educational, governmental, or other network, and may include multiple networks, computing resources, and other facilities, may be distributed among more than one geographical locations, and may include an administration service 114, a firewall 116, an appliance 118, a server 120, network devices 122 including access points 138 and a gateway 140, and endpoint devices such as client devices 124 or IoT devices.

The threat management service 102 may include computers, software, or other computing service supporting a plurality of functions, such as one or more of a security management service 108, a policy management service 106, a remedial action service 110, a threat research service 112, and the like. In some embodiments, the threat protection provided by the threat management service 102 may extend beyond the network boundaries of the network 104 to include client devices 124 that have moved into network connectivity not directly associated with or controlled by the network 104. Threats to client facilities may come from a variety of sources, such as network threats 132, physical proximity threats, and the like. Client device 124 may be protected from threats even when the client device 124 is not directly connected to or in association with the network 104, such as when a client device 124 moves in and out of the network 104, for example, when interfacing with an unprotected server 120 through the internet 128.

The threat management service 102 may use or may be included in an integrated system approach to provide the network 104 with protection from a plurality of threats to device resources in a plurality of locations and network configurations. The threat management service 102 may also or instead be deployed as a stand-alone solution for an enterprise. For example, some or all of the threat management service 102 components may be integrated into a server or servers on-premises or at a remote location, for example, in a cloud computing service. For example, some or all of the threat management service 102 components may be integrated into a server 120, firewall 116, gateway 140, appliance 118, or access point 138 within or at the border of the network 104. In some embodiments, the threat management service 102 may be integrated into a product, such as a third-party product (e.g., through an application programming interface), which may be deployed on endpoints, on remote servers, on internal servers or gateways for a network, or some combination of thereof.

The security management service 108 may include a plurality of elements that provide protection from malware to device resources of the network 104 in a variety of ways, including endpoint security and control, email security and control, web security and control, reputation-based filtering, control of unauthorized users, control of guest and non-compliant computers, and the like. The security management service 108 may also provide protection to one or more device resources of the network 104. The security management service 108 may have the ability to scan client service files for malicious code, remove or quarantine certain applications and files, prevent certain actions, perform remedial actions and perform other security measures. This may include scanning some or all of the files stored on the client service or accessed by the client service on a periodic basis, scanning an application when the application is executed, scanning data (e.g., files or other communication) in transit to or from a device, etc. The scanning of applications and files may be performed to detect known or unknown malicious code or unwanted applications.

The security management service 108 may provide email security and control. The security management service 108 may also or instead provide for web security and control, such as by helping to detect or block viruses, spyware, malware, unwanted applications, and the like, or by helping to control web browsing activity originating from client devices. In some embodiments, the security management service 108 may provide network access control, which may provide control over network connections. In addition, network access control may control access to virtual private networks (VPN) that provide communications networks tunneled through other networks. The security management service 108 may provide host intrusion prevention through behavioral-based analysis of code, which may guard against known or unknown threats by analyzing behavior before or while code executes. Further, or instead, the security management service 108 may provide reputation filtering, which may target or identify sources of code.

In general, the security management service 108 may support overall security of the network 104 using the various techniques described herein, optionally as supplemented by updates of malicious code information and so forth for distribution across the network 104. Information from the security management service 108 may also be sent from the enterprise back to a third party, a vendor, or the like, which may lead to improved performance of the threat management service 102. For example, threat intelligence service 144 can receive information about newly detected threats from sources in addition to the threat management service 102 and can provide intelligence on new and evolving threats.

The policy management service 106 of the threat management service 102 may be configured to take actions, such as to block applications, users, communications, devices, and so on based on determinations made. The policy management service 106 may employ a set of rules or policies that determine network 104 access permissions for one or more of the client devices 124. In some embodiments, a policy database may include a block list, a black list, an allowed list, a white list, or the like, or combinations of the foregoing, that may provide a list of resources internal or external to the network 104 that may or may not be accessed by the client devices 124. The policy management service 106 may also or instead include rule-based filtering of access requests or resource requests, or other suitable techniques for controlling access to resources consistent with a corresponding policy.

As threats are identified and characterized, the threat research service 112 may create updates that may be used to allow the threat management service 102 to detect and remediate malicious software, unwanted applications, configuration and policy changes, and the like. The threat research service 112 may contain threat identification updates, also referred to as definition files and can store the definition files in the knowledgebase 136. A definition file may be a virus identity file that may include definitions of known or potential malicious code. The virus identity definition files may provide information that may identify malicious code within files, applications, or the like. In some embodiments, the definition files can include hash values that can be used to compare potential malicious code against known malicious code. In some embodiments, the definition files can include behavior characterizations, such as graphs of malware behavior. In some embodiments, the threat research service 112 can detonate possible malware to create the behavioral characterizes to be included in the definition files.

The definition files may be accessed by the security management service 108 when scanning files or applications within the client service for the determination of malicious code that may be within the file or application. The definition files include a definition for a neural network or other recognition engine to recognize malware. The threat research service 112 may provide timely updates of definition files information to the knowledgebase 136, network 104, and the like.

In some embodiments, in addition to characterizing detected and known malware in the definition files, the threat research service 112 can utilize a polymorphism service 134 to attempt to improve the ability to recognize polymorphic variants of detected malware. In some embodiments, the polymorphism service 134 can make use of a generative large language model to create polymorphic variants of malware and determine if the polymorphic variants are detected by the security management service 108. When a polymorphic variant is not detected, the polymorphic variant can be detonated using detonation service 142. The threat research service 112 can store a hash value and any updates to the behavioral characterizations as part of the definitions files to ensure that the polymorphic variant of the malware will be detected if ever encountered.

The security management service 108 may be used to scan an outgoing file and verify that the outgoing file is permitted to be transmitted per rules and policies of the network 104. By checking outgoing files, the security management service 108 may be able to discover malicious code infected files that were not detected as incoming files. Additionally, the security management service 108 can generate outgoing files for data loss prevention against data loss prevention policies configured by the policy management service 106.

When a threat or policy violation is detected by the threat management service 102, the threat management service 102 may perform or initiate remedial action through the remedial action service 110. Remedial action may take a variety of forms, such as terminating or modifying an ongoing process or interaction, issuing an alert, sending a warning (e.g., to a client device 124 or to the administration service 114) of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on one or more of the client devices 124, quarantining a related application (or files, processes or the like), terminating the application or device, isolating the application or device, moving a process or application code to a sandbox for evaluation by the detonation service 142, isolating one or more of the client devices 124 to a location or status within the network that restricts network access, blocking a network access port from one or more of the client device 124, reporting the application to the administration service 114, or the like, as well as any combination of the foregoing.

In some embodiments, the threat intelligence service 144 offers intelligence on the latest threats and solutions for prevention. For example, the threat intelligence service 144 provides instructional data to all security devices such as threat management service 102 and provides information to create definition files to identify the latest threat to protect the network from newly detected attacks. The main advantage of the threat intelligence service 144 is the large amount of security network devices that can provide threat intelligence service 144 with data on detected and undetected threats. There can be many security devices across many different networks, enterprises, and vendors that can feed information to the threat intelligence service 144, and therefore threat intelligence service 144 has more data on threats than the threat management service 102. The threat intelligence service 144 collects data from many devices and adds the collected data to data collected by partners to the threat intelligence service 144 to analyze vectors of new attacks. The threats are tracked using digital signatures that can be used in the definition files used by the threat management service 102

One type of signature is a Hash-Based signatures. The hashes are generated through dynamic sandboxing, control flow graph analysis, memory scanning, behavior-based detection, and other methods for identifying malicious code. The threat intelligence service 144 can then provide detailed reports with threat indicators that can help administrators track down malicious code and reduce their risk of infection.

Another type of signature is a Pattern Based Signatures or BASS (Automated Signature Synthesizer). BASS (Automated Signature Synthesizer) is a framework designed to automatically generate antivirus signatures from samples belonging to previously generated malware clusters. BASS is meant to reduce resource usage by producing more pattern-based signatures as opposed to hash-based signatures. Compared to pattern-based or bytecode-based signatures, hash-based signatures have the disadvantage of only matching a single file per signature. Pattern-based signatures are able to identify a whole cluster of files instead of just a single file.

The threat management service 102 may provide threat protection across the network 104 to devices such as the client devices 124, the servers 120, the administration service 114, the firewall 116, the access point 138, the gateway 140, one or more of the network devices 122 (e.g., hubs and routers), one or more of the appliances 118 (e.g., a threat management appliance), any number of desktop or mobile users, and the like in coordination with an endpoint computer security service. The endpoint computer security service may be an application locally loaded onto any device or computer support component on network 104, either for local security functions or for management by the threat management service 102 or other remote resource, or any combination of thereof.

The network 104 may include one or more of the servers 120, such as application servers, communications servers, file servers, database servers, proxy servers, mail servers, fax servers, game servers, web servers, and the like. In some embodiments, the threat management service 102 may provide threat protection to servers 120 within the network 104 as load conditions and application changes are made.

The client devices 124 may be protected from threats from within the network 104 using a local or personal firewall, which may be a hardware firewall, software firewall, or a combination thereof, that controls network traffic to and from a client. The local firewall may permit or deny communications based on a security policy.

The interface between the threat management service 102 and the network 104 to embedded endpoint computer security facilities, may include a set of tools that may be the same or different for various implementations and may allow network administrators to implement custom controls. In some embodiments, the custom controls may include both automatic actions and managed actions. The administration service 114 may configure policy rules that determine interactions.

Interactions between the threat management service 102 and the components of the network 104, including mobile client service extensions of the network 104, may ultimately be connected through the internet 128 or any other network or combination of networks. Security-related or policy-related downloads and upgrades to the network 104 may be passed from the threat management service 102 through to components of the network 104 equipped with the endpoint security management service 108. In turn, the endpoint computer security management services 108 of the enterprise threat management service 102 may upload policy and access requests back across the internet 128 and through to the threat management service 102. The internet 128, however, is also the path through which threats may be transmitted from their source, and one or more of the endpoint computer security facilities may be configured to protect a device outside the network 104 through locally deployed protective measures and through suitable interactions with the threat management service 102.

Thus, if the mobile client service were to attempt to connect to an unprotected connection point that is not a part of the network 104, the mobile client service, such as one or more of the client devices 124, may be required to request network interactions through the threat management service 102, where contacting the threat management service 102 may be performed prior to any other network action. In embodiments, the endpoint computer security service of the client device 124 may manage actions in unprotected network environments such as when the client service (e.g., the client device 126) is in a secondary location, where the endpoint computer security service may dictate which applications, actions, resources, users, etc. are allowed, blocked, modified, or the like.

Figure 2:
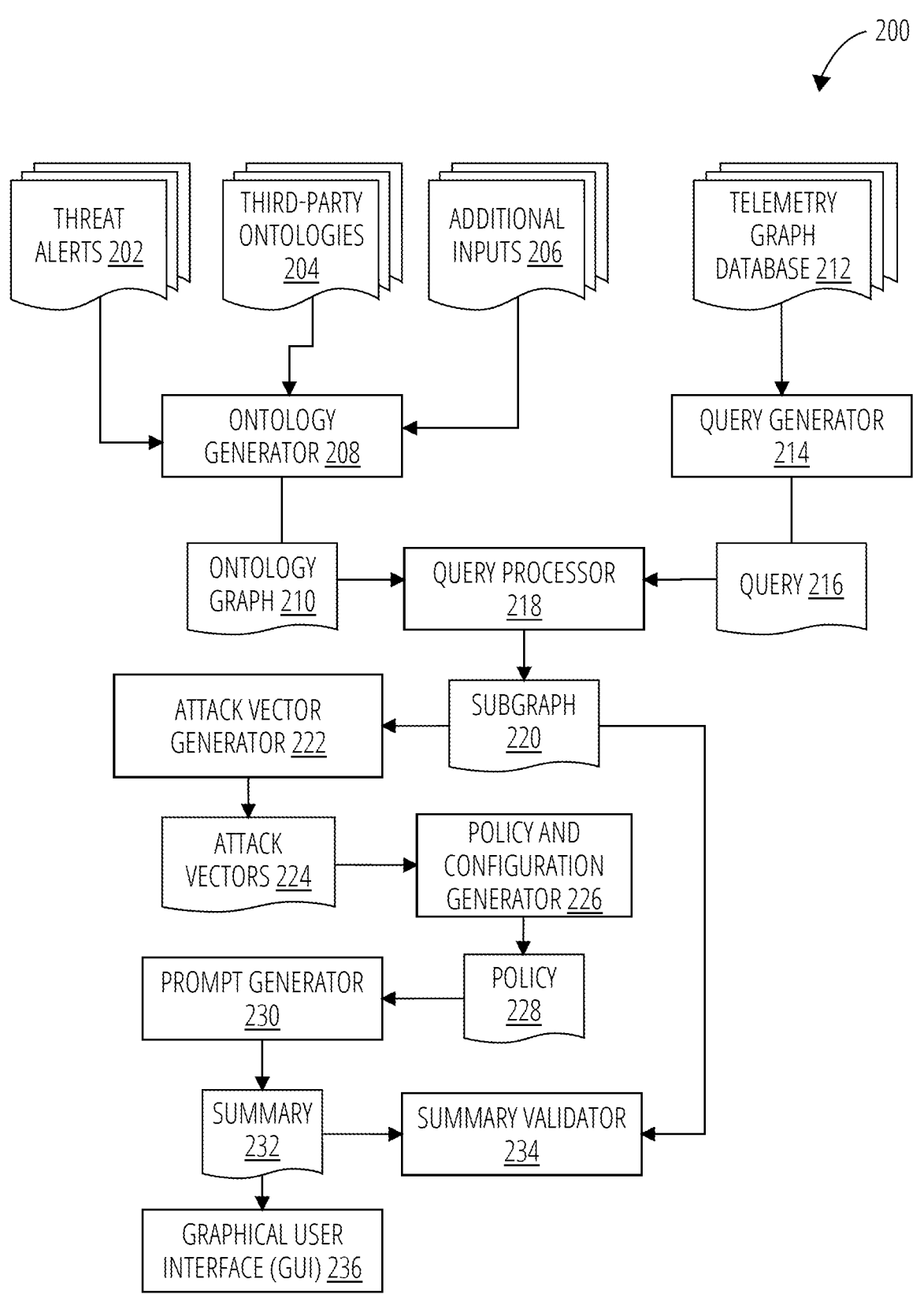
FIG. 2 illustrates a block diagram for an example of a system/device for providing a text summary of the information conveyed by a graph related to a security alert according to some embodiments of the present technology.

FIG. 2 shows an example of an ontology summary system 200 that generates prompts summarizing the security incident giving rise to a threat alert. The ontology summary system 200, includes an ontology generator 208 that takes in different inputs like threat alerts 202, third-party ontologies 204, and additional inputs 206. Using these inputs, the ontology generator 208 produces an ontology graph 210 that shows the relationships between entities of computational instructions that have been carried out by a computer or processor. The entities can include files, executable binary, processes, domain names, IP addresses, etc.

The ontology summary system 200 also has a query generator 214 that creates a query 216 based on values from a telemetry graph database 212, which stores graphs/patterns that represent respective malicious behaviors. The query 216 includes a query graph that is compared to various portions of the ontology graph 210 by the query processor 218. This comparison can be based on the topology (e.g., the spatial relations) and content (e.g., values of the vertices/nodes and relations expressed by the edges). When a match is found, the portion of the ontology graph 210 that matches the query graph is returned as subgraph 220.

The remainder of the ontology summary system 200 provides a summary 232 of subgraph 220 and then validates the summary and displays the summary in a graphical user interface (GUI) 236. First, the attack vector generator 222 converts the subgraph 220 of detected malware identified during penetration testing into a plurality of attack vectors 224. An attack vector is a specific route or method that malicious actors could employ to exploit vulnerabilities within a system, network, application, or device. The attack vector serves as a meticulously mapped-out pathway that outlines the sequence of steps an attacker might follow to compromise the intended target. The attack vectors with assist in the identification of potential weaknesses that necessitate mitigation to fortify the defenses of a system. The attack vectors encompass a wide array of techniques that can be categorized into various classes. Network-based attacks, for instance, revolve around leveraging vulnerabilities present in network protocols, services, or devices. Examples of such activities comprise intercepting communications through Man-in-the-Middle (MitM) attacks, distributed denial of service (DDoS) attacks, and network sniffing.

In an example, during web-based attacks, penetration testing can detect tactics such as cross-site scripting (XSS), where attackers inject malicious scripts into web pages, and SQL injection, which involves manipulating databases through improperly sanitized inputs. Additionally, common attack vectors that target operating systems can be exposed by exploiting known vulnerabilities to gain unauthorized access. Examples of such threats include privilege escalation attacks buffer overflow attacks, and the execution of arbitrary code.

The attack vectors 224 generated by the attack vector generator 222 can exemplify a category of attack vectors that hinge on manipulating individuals into revealing sensitive information. This grouping encompasses tactics like phishing, which deceives users into disclosing their credentials or other confidential data, and pretexting, a method involving the creation of fictitious scenarios to mislead individuals into sharing information. Thus, the attack vectors 224 can identify vulnerabilities in wireless networks characterize wireless attacks, that can be exploited by attackers, which lead to unauthorized access to Wi-Fi networks or the initiation of various malicious activities.

Using the attack vectors 224, a policy and configuration generator 226 then generates a policy 228 for the prompt generator 230. Policy 228 directs the prompt generator 230 regarding the substance (e.g., the attack vectors 224) and style of the summary 232 to be created by the prompt generator 230. Policy 228 can include a comprehensive list of known attack vectors relevant to the system or software in consideration. This list could contain vulnerabilities, exploits, malware, and social engineering tactics. For each attack vector identified, policy 228 outlines which specific security measures and configurations are necessary to mitigate or prevent any associated attacks. The security measures could encompass updated configurations for network appliances in the wireless network, security controls, wireless network configurations, and network access controls.

Additionally, the generated policy 228 could include mappings between attack vectors and corresponding security measures to ensure that appropriate steps are taken for each type of attack vector. The mapping could include configurations that are identified as being most effective against specific attack vectors, and malware that has previously penetrated the security system, allowing for the ability to take proactive steps to protect the network and the associated systems and data from malicious actions and attackers. In some examples, the prompt can identify a plurality of relationships between wireless appliances or nodes within the network. For example, the prompt can express more complex relationships between three or more nodes, thereby making broader connections that can help security analysts more quickly comprehend the information expressed by subgraph 220. Thus, security analysts can more quickly assess a threat alert stimulated by identified penetration of the network system by malware.

The summary validator 234 checks the summary 232 to determine whether the summary is consistent with the subgraph 220, thereby ensuring that important aspects of the subgraph were not lost or misinterpreted in the translation from the subgraph 220 to the summary 232. For example, a machine learning (ML) method can convert the summary back to a graph that is compared to the subgraph 220 to determine whether features of the subgraph have been preserved.

Additionally, the summary 232 can be displayed in the GUI 236. The GUI 236 can include both the text of the summary 232 and a visual representation of the subgraph 220. The subgraph 220 provides ground truth, and the summary 232 provides a more easily comprehended mechanism for understanding the subgraph 220. According to certain non-limiting examples, a user can select a portion of the text of the summary 232, and in response, the GUI 236 highlights a corresponding portion of the subgraph associated with the selected text. Thus, starting from the text of the summary, a security analyst can quickly find the relevant features in the subgraph 220 that correspond to portions of the text of the summary. Then referring to the corresponding region of the subgraph 220, the security analyst can verify that, for the relevant features, the relations expressed in the text are consistent with the corresponding region of the subgraph 220, thereby confirming a correct understanding of the threat.

Automating the generation and updating of firewall rules can provide numerous advantages that greatly improve network security and operational efficiency. Automating firewall rules enables quick adaptation to network changes and threats. This real-time adaptability allows for an efficient update of firewall rules immediately to address new security vulnerabilities or block malicious traffic patterns without manual intervention. As a result, the window of vulnerability to cyberattacks is reduced.

By automating the process of generating and managing firewalls, the chances of human error are significantly reduced. When rules are created or updated manually, there is a higher risk of mistakes occurring, resulting in misconfigurations or security vulnerabilities. However, with automation, risks can be eliminated, as firewall rules can be consistently accurate and adhere to security best practices.

In addition, automation boosts productivity and adaptability and simplifies the process of managing rules, which saves IT and security teams a significant amount of time and energy. This becomes especially important as networks become more complex and expansive, to enable the efficient management of numerous rules across multiple devices.

Further, consistency in implementing security policies is ensured through automated policy enforcement. By automatically generating and updating rules, a consistent approach is maintained. This reduces the chances of overlooking or conflicting policies, making the network environment more secure. Further, the security policies can also allow for proactive threat mitigation by continuously monitoring network traffic, detecting suspicious or malicious patterns, and immediately creating or modifying rules to block potential threats.

FIG. 3A illustrates an example routine 300 for automated creation and management of firewall rules by a threat management system according to some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In some examples, different components of an example device or system that implements the routine may perform functions at substantially the same time or in a specific sequence.

At block 302 routine 300 includes collecting firewall data from the firewall at block 302. In some examples, a threat management system can receive from a firewall raw data related to interaction detected at the firewall. In the context of network security and monitoring, integration of a threat management system, with an existing firewall, deployed within a customer's network environment can be employed to detect network activity at the firewall to enhance network visibility and security posture. The threat management system can facilitate the exchange of data from the firewall that contains information about the network traffic passing through the firewall. The information can include details related to the source and destination of the traffic, the protocols used, and the duration of connections. In some examples, the threat management system can include a firewall data flow collector that can collect the data for at least 30 days, to guarantee sufficiency of data collected from the firewall.

At block 304, routine 300 can include exporting the firewall data to a threat intelligence service. The exporting of the firewall data by the threat management system can ensure that the firewall data is efficiently managed and prepared for analysis by the threat intelligence service. The collection of data can contain critical information about communication patterns among network devices, such as source and destination IP addresses, ports, protocols, and data transfer quantities.

At block 306, routine 300 includes generating a communication flow matrix. In some examples, the threat intelligence service can receive, store, and organize the exported flow data received into a communication flow matrix that is conducive to comprehensive analysis, that outlines the interactions between various network devices and tracks the flow of data between them. This analysis can encompass a wide range of objectives, including the identification of network traffic patterns, detection of anomalies, mitigation of security threats, and optimization of network performance. Visualizations, reports, and alerts based on the communication flow matrix can further be generated to provide valuable insights into the network's behavior. Further explanation as it relates to the generation of the communication flow matrix is provided below in the discussion of FIG. 3B.

At block 308, routine 300 includes generalizing the communication flow matrix. The communication flow matrix provides detailed raw data on every individual communication or session that takes place between applications on the network. Accordingly, the threat intelligence service can analyze the internet protocol (IP) address in the matrix to generate a flow generalization of the communication flow matrix. Further explanation as it relates to the generalizing of the communication flow matrix is provided below in the discussion of FIG. 3C.

At block 310, routine 300 includes generating firewall rules using the communication flow matrix. In some examples, the firewall rules can be created in JSON/XML or TXT formats using the firewall rules matrix generated from the communication flow matrix.

According to some examples, the routine 300 includes injecting firewall rules generated using the communication flow matrix into the firewall at block 312. In some examples, the firewall can be injected via a push notification using Rest API/SSH.

At block 314, the routine 300 includes logging permissive rules on the firewall. By logging permissive rules at the firewall, data traffic can be identified that was not previously detected by firewall data flow collector. Thus, the likelihood of inadequate firewall rules can be reduced to ensure the efficacy of the firewall rules generated by the threat management system.

At block 316, the threat management system can determine if this is the first time the threat management system is performing monitoring of the firewall data at the firewall for a time period. If determined that this is the first time for monitoring firewall data at the firewall during the time period, the threat management system can repeat the steps at block 302-block 314. If determined that this is at least the second time performing the monitoring of the firewall data at the firewall during the time period, at block 318, the routine 300 can proceed to monitor a hit count at the firewall.

Monitoring hit counts at a firewall allows for a proactive approach to collecting invaluable insights into the network's traffic patterns and the effectiveness of the firewall rules. Each hit at the firewall can represent an instance where a specific rule has been triggered by incoming or outgoing network traffic. This data can allow the threat management system to determine which firewall rules are actively engaged and which firewall rules are rarely or never utilized, facilitating a more informed rule management generation process.

In some examples, firewall rules with consistently high hit counts can demonstrate their relevance and functionality in managing traffic, while those with low or zero hits may require review or removal. This evaluation enables the threat management system to optimization groups of firewall rules and firewall policies to better align them with specific security objectives and network requirements.

Additionally, monitoring the hit count can provide early threat detection. Sudden spikes in hit counts on particular firewall rules may indicate security incidents or anomalous network behavior. In some examples, a rapid increase in hits on a rule designed to block specific traffic could signal a potential attack or intrusion attempt at the firewall. By monitoring the hit count, the threat management system can analyze the hit count data, to swiftly detect and respond to anomalies.

At block 320, the routine 300 includes adding a restrictive rule to the firewall. Adding a restrictive firewall rule to a set of firewall rules can bolster network security and safeguard critical assets by limiting or blocking specific types of traffic or connections that are deemed unnecessary or potentially harmful. A restrictive firewall rule can act as a barrier against unauthorized access, potential threats, or unwanted network activities at the firewall. The restrictive firewall rule can explicitly define what is not allowed, enforce a proactive security stance, reduce the attack zones of the firewall and the network, and minimize the risk of cyberthreats. For example, a restrictive firewall rule can block incoming traffic on specific ports of the network that are not required for normal network operation or services that are known to be vulnerable to exploitation.

At block 322, the routine can finalize the firewall rules. The finalized set of firewall rules can include an updated set of firewall rules that include the restrictive firewall rules added to the firewall. The updated set of firewall rules can also include rules that have been deleted that were identified as having a hit count of 0, or identified as a shadow rule.

Figure 3B:
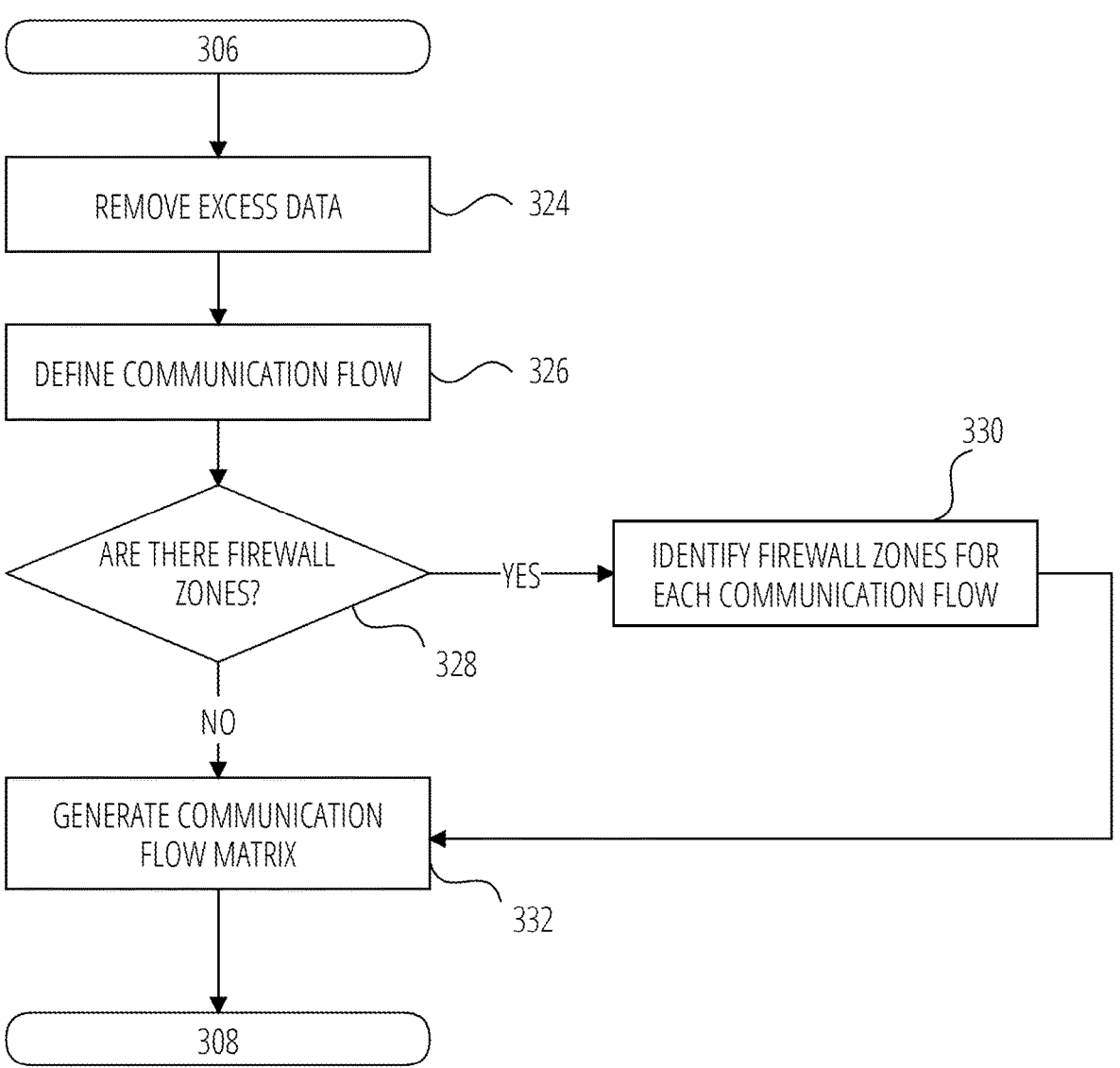
FIG. 3B illustrates an example routine for generating a communication flow matrix aspect of the subject matter according to some embodiments of the present technology.

FIG. 3B illustrates an example routine for generating a communication flow matrix as shown in block 306, according to some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

After receiving the exported data from the firewall at block 304, a communication flow matrix can be generated in accordance with the depiction shown in FIG. 3B. At block 324, routine 300 includes generating the communication flow matrix includes removing the excess data received from the exported data. According to some examples, the routine 300 includes removing excess data at block 324.

In some examples, the removal of excess data from firewall data received from the firewall reduces the amount of data to that of relevant firewall data associated with a particular security incident. Thus, the threat management system instructs the threat intelligence service to analyze only a relevant set of firewall data to increase the ability to pinpoint relevant details during security incident investigations or routine analysis.

In some examples, the firewall data export may contain too much information for the threat intelligence service to handle. In such cases, the data can be filtered and a new table can be created, which will only include specific categories such as searchSubject.ipAddress, searchSubject.portProtocol.protocol, peer.ipAddress, peer.interfaces.name, peer.portProtocol.port, and peer.interfaces.flowAction. This table is generated only if the number of received data packets from a peer to each flow is equal to or greater than 100, as indicated by the peer.transferPackets column in a table that is configured to monitor the firewall data traffic flow between the source IP and the destination IP.

At block 326, the routine 300 includes defining the communication flows. In some examples, defining the communication flows includes using the filtered data to identify network characteristics associated with the filtered firewall data. For example, the filtered data can be analyzed to identify the source IP from searchSubject.ipAddress, the destination IP from peer.ipAddress, the protocol from searchSubject.portProtocol.protocol, the destination port from peer.portProtocol.port, an action from peer.interfaces.flowAction, a source interface from peer.interfaces.name, and destination interface from peer.interfaces.name.

At block 330, routine 300 includes identifying firewall zones for each communication flow in block 326, if it is determined that the firewall uses a zone approach to protect the network at block 328.

The use of firewall zones enhances network security by segmenting the network into distinct security zones, each with its own set of rules and policies that provide a robust level of security isolation. For example, higher-security zones, such as the internal network, can be isolated from lower-security zones like guest networks. This isolation ensures that sensitive data and critical resources remain protected from potentially compromised or untrusted areas of the network. Furthermore, firewall zones can enable precise access control that through granular control minimizes the risk of unauthorized access, reducing the potential for security breaches and lateral movement by malicious actors.

In some examples, the employment of zone-based policies also enhances security through traffic inspection. Traffic inspection allows the firewall to inspect network traffic while traversing between zones, employing deep packet inspection, stateful analysis, and application-level filtering. This scrutiny allows the firewall to identify and control traffic based on content and behavior, preventing the passage of potentially malicious data.

At block 332, the communication flow matrix can be generated and defined using data from each of blocks 324 to 330. The communication flow matrix can further be utilized to generate a firewall data table that includes data categories including Sequence number (#), Source IP, Destination IP, Protocol, Destination Port, Action, Source interface or Source Zone, and Destination interface or Destination Zone.

The communication flow matrix can be generalized in block 308, as discussed in FIG. 3C.

FIG. 3C illustrates an example routine for generalizing the communication flow matrix according to some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The communication flow matrix provides detailed information on each individual communication or session that takes place between applications on the network. This data is considered raw and must be analyzed to determine if the data can be summarized through a flow generalization. Without flow generalization, the number of rules that can be created at the Firewall could be overwhelming and inefficient. Thus, generalizing the communication flow matrix can often involve looping through the communication flow matrix, as provided by the below discussion of FIG. 3C.

At block 334, the routine 300 includes creating a firewall rules matrix that includes a plurality of destination servers. In some examples, as shown in Table 1 below, the firewall rules matrix can include the generating of the firewall rules matrix including firewall data categories including source IP, source interface/zone, destination IP, destination interface/zone, protocol, destination port, and action.

TABLE 1

| # | Source | Source Interface/ Source Zone | Desti- nation IP | Destination Interface/ Destination Zone | Protocol | Desti- nation Port | Action |
|---|---|---|---|---|---|---|---|
| 1 | | | | | | | |
| 2 | | | | | | | |
| 3 | | | | | | | |
| 4 | | | | | | | |

At block 336, a destination server can be selected from the communication flow matrix. As shown in Table 2 below, a destination server can be selected from the communication flow matrix with protocol, destination port, and action values. For example, the first destination server from the communication flow matrix depicted in Table 2 is 192.168.10.10, "Protocol" is "TCP", "Destination port" is 443, "Action" is "Allow".

TABLE 2

| # | Source IP | Destination IP | Protocol | Destination Port | Action | Source interface or Source Zone | Destination interface or Destination Zone |
|---|---|---|---|---|---|---|---|
| 1 | 192.168.1.4 | *192.168.10.10* | *TCP* | *443* | *Allow* | Outside | Inside |
| 2 | 192.168.1.5 | 192.168.10.10 | TCP | 443 | Allow | Outside | Inside |
| 3 | 192.168.1.6 | 192.168.10.10 | TCP | 443 | Allow | Outside | Inside |
| 4 | 192.168.1.7 | 192.168.10.10 | TCP | 443 | Allow | Outside | Inside |
| 5 | 192.168.2.3 | 192.168.12.11 | TCP | 443 | Allow | Outside | Inside |
| 6 | | | | | | | |

At block 338, client devices can be identified that are communicating with a destination server. As shown in Table 2, all client devices associated with the source IP, communicating with a destination server selected at block 336, are collected from the communication flow matrix.

For example, with reference to Table 3 below, clients communicating with destination IP=192.168.10.10", "Protocol=TCP", "Destination Port=443", "Action=Allow", and "Source interface or Source zone=Outside" according to the "Communication flows matrix" are identified as 192.168.1.4, 192.168.1.5, 192.168.1.6, and 192.168.1.7

TABLE 3

| # | Source IP | Destination IP | Protocol | Destination Port | Action | Source interface or Source Zone | Destination interface or Destination Zone |
|---|---|---|---|---|---|---|---|
| *1* | *192.168.1.4* | *192.168.10.10* | *TCP* | *443* | *Allow* | *Outside* | *Inside* |
| *2* | *192.168.1.5* | *192.168.10.10* | *TCP* | *443* | *Allow* | *Outside* | *Inside* |
| *3* | *192.168.1.6* | *192.168.10.10* | *TCP* | *443* | *Allow* | *Outside* | *Inside* |
| *4* | *192.168.1.7* | *192.168.10.10* | *TCP* | *443* | *Allow* | *Outside* | *Inside* |
| 5 | 192.168.2.3 | 192.168.12.11 | TCP | 443 | Allow | Outside | Inside |
| 6 | | | | | | | |

At block 340, classifications of each of the client devices can be defined. Accordingly, the client devices, associated with the source IPs in Table 3, are assigned to private network classes. For example, private network classes can be defined as Private Class A—10.0.0.0/8; Private Class B—172.16.0.0/12; and Private Class C—192.168.0.0/16. Thus, IP addresses shown in Table 3, 192.168.1.4, 192.168.1.5, 192.168.1.6, and 192.168.1.7 belong to Private Class C network.

At block 342, neighboring devices for each of the client devices can be identified. With reference to Table 3, the IP neighbor client devices are client devices with a last octet value that is bigger or lower by 1 relative to other neighboring client devices. For example, IP neighbor client for IP 192.168.1.4 is 192.168.1.5, IP neighbor clients for IP 192.168.1.5 are 192.168.1.4 and 192.168.1.6, IP neighbor clients for IP 192.168.1.6 are 192.168.1.5 and 192.168.1.7 and IP neighbor client for IP 192.168.1.7 is 192.168.1.6.

At block 344, a summary is generated for all of the neighboring devices into a single subnet mask, to efficiently summarize the IP neighbor client devices defined in block 342. To summarize the IP neighbor client devices, the IP neighbor client devices must first form a contiguous row of IP addresses. The contiguous row of IP addresses must fully or partly belong to the subnet which exists in the corresponding private class network. Namely the number of IP addresses in the contiguous row of IP addresses is equal to or higher than the number of hosts in the corresponding subnet.

In some examples, if the number of IP addresses in the contiguous row of IP addresses is equal to the number of hosts in the corresponding subnet, then the corresponding subnet will be used as source IP. If the number of IP addresses in the contiguous row of IP addresses is less than the number of hosts in the corresponding subnet, then the smaller size of the subnet must be used as Source IP. For example, clients IP addresses 192.168.1.4, 192.168.1.5, 192.168.1.6, and 192.168.1.7, shown in Table 3 fully belong to the subnet 192.168.1.4/30. Subnet 192.168.1.4/30 will be used as Source IP.

At block 346, a data record can be generated for the summary of neighboring devices in block 344. The data record can be generated based on the firewall rules matrix defined in block 334, the source IP from defined at block 344, the "Destination IP", "Protocol", "Destination Port", and "Action" in Table 1 in accordance with block 336, and the source zone and destination from the firewall configuration. For example, the generalized flow for clients 192.168.1.4, 192.168.1.5, 192.168.1.6, 192.168.1.7 and server 192.168.10.10 with "Protocol=TCP", "destination Port=443" and "Action=Allow" is as follows in Table 4:

TABLE 4

| # | Source IP | Source interface/ Source Zone | Destination IP | Destination interface/ Destination Zone | Protocol | Destination Port | Action |
|---|-----------|-------------------------------|----------------|-----------------------------------------|----------|------------------|--------|
| 1 | 192.168.1.4/30 | Outside | 192.168.10.10 | Inside | TCP | 443 | Allow |
| 2 | | | | | | | |
| 3 | | | | | | | |
| 4 | | | | | | | |

At block 348, the communication flow matrix as shown in Table 1 is analyzed to determine if there is a next destination server in the loop. If there is a next destination server, the steps defined in block 334 through block 336 are repeated. If all destination servers have been processed, the routine 300 proceeds to block 310 where firewalls are generated using the communication flow matrix.

FIG. 4 illustrates an example process 400 for automated creation and management of firewall rules in a network environment according to some embodiments of the present technology. Although the example process 400 depicts a particular sequence of operations, the sequence may be altered without departing from the scope of the present disclosure. For example, some of the operations depicted may be performed in parallel or in a different sequence that does not materially affect the function of the process 400. In other examples, different components of an example device or system that implements process 400 may perform functions at substantially the same time or in a specific sequence.

According to some examples, the process 400 includes obtaining network traffic patterns including data exported from one or more network appliances in the network environment at block 402. For example, the threat management service 102 illustrated in FIG. 1 may obtain network traffic patterns including data exported from one or more network appliances in the network environment. This threat management service 102 can gather network traffic patterns by retrieving data from various network appliances within the network environment. The data obtained can include multiple network identifiers such as MAC addresses, IP addresses, domain names, hostnames, and port numbers.

According to some examples, process 400 includes automatically generating a first set of firewall rules based on a source and a destination of each network identifier at block 404. For example, the policy management service 106 illustrated in FIG. 1 can automatically generate a first set of firewall rules based on the source and destination of each network identifier received by the threat management service. Each network identifier can identify a source network appliance and destination network appliance of each network identifier that is associated with the generated first set of firewall rules.

Further, process 400 comprises monitoring the network traffic patterns to detect when incoming or outgoing network traffic matches one or more conditions specified in one or more firewall rules from the first set of firewall rules. For example, the policy management service 106 illustrated in FIG. 1 may monitor the network traffic patterns to detect when incoming or outgoing network traffic matches one or more conditions specified in one or more firewall rules from the first set of firewall rules.

Further, process 400 comprises generating an invocation event upon detection of said matching network traffic. For example, the threat management service 102 illustrated in FIG. 1 may generate an invocation event upon detection of said matching network traffic. The invocation event is configured to trigger an automatic modification of the first set of firewall rules.

According to some examples, process 400 includes automatically generating a second set of firewall rules based on firewall data including a source and destination address at block 406. For example, the policy management service 106 illustrated in FIG. 1 may automatically generate a second set of firewall rules based on firewall data including a source and destination address. Further, the second set of firewall rules being generated can include automatically modifying or removing existing firewall rules in the first set of firewall rules based on real-time network activity and threat intelligence data at the firewall.

Further, the process 400 comprises automatically modifying the first set of firewall rules, to remove one or more firewall rules in the first set of firewall rules to generate the second set of firewall rules based on real-time network activity and threat intelligence data received at the firewall. For example, the policy management service 106 illustrated in FIG. 1 may automatically modify the first set of firewall rules, to remove one or more of the firewall rules in the first set of firewall rules to generate the second set of firewall rules based on real-time network activity and threat intelligence data received at the firewall.

Further, process 400 comprises injecting the second set of firewall rules into the network environment. For example, the threat management service 102 illustrated in FIG. 1 may inject the second set of firewall rules into the network environment. In some examples, the network environment may have multiple zones of origination. Each zone of origination represents distinct network segments or domains within the network environment, facilitating the identification of one or more correlations between zones of origination of the firewall data associated with each network identifier received at the firewall. The injecting includes associating each firewall rule in the second set of firewall rules with specific network identifiers and a corresponding zone of origination.

According to some examples, process 400 includes generating a revised set of firewall rules based on the first set of firewall rules and the second set of firewall rules at block 408. For example, the policy management service 106 illustrated in FIG. 1 may generate a revised set of firewall rules based on the first set of firewall rules and the second set of firewall rules. The revised set of firewall rules can also be based on a detection of a number of times at least one of the second set of rules is invoked at the firewall.

Figure 5:
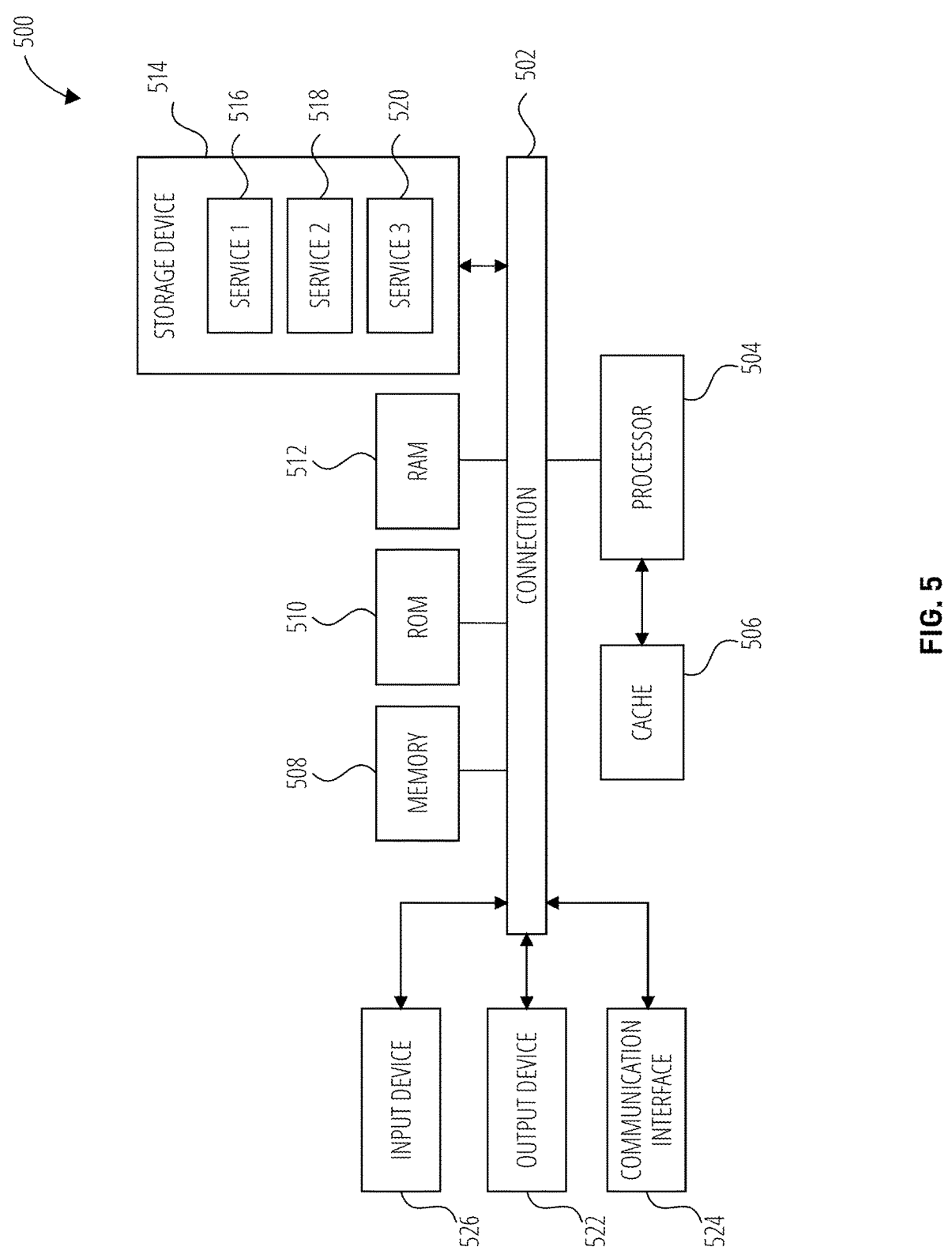
FIG. 5 illustrates a block diagram for an example of a computing device according to some embodiments of the present technology.

FIG. 5 shows an example of computing system 500, which can be for example any computing device making up the system network 104 of FIG. 1, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (central processing unit (CPU) or processor) 504 and connection 502 that couples various system components including system memory 508, such as read-only memory (ROM) 510 and random access memory (RAM) 512 to processor 504. Computing system 500 can include a cache 506 of high-speed memory 508 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of thereof.

The storage device 514 can include software services, servers, services, etc., that when the code that defines such software is executed by the processor 504, the code causes the system to perform a function. In some embodiments, a hardware service that performs a particular function can include the software component stored in a computer-readable medium in connection with the hardware components, such as processor 504, connection 502, output device 522, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some aspects of the present technology include:

Aspect 1. A method for automated creation and management of firewall rules in a network environment, comprising: obtaining network traffic patterns including data exported from one or more network appliances in the network environment, wherein the data includes a plurality of network identifiers; automatically generating a first set of firewall rules based on a source and destination of each network identifier; automatically generating a second set of firewall rules based on firewall data including a source and destination of address; and generating a revised set of firewall rules based on the first set of firewall rules and the second set of firewall rules, wherein the revised set of firewall rules is also based on a detection of a number of times at least one of the second set of rules is invoked at the firewall.

Aspect 2. The method of Aspect 1, wherein generating the second set of firewall rules includes automatically modifying or removing existing firewall rules in the first set of firewall rules based on real-time network activity and threat intelligence data at the firewall.

Aspect 3. The method of any of Aspects 1 to 2, further comprising: injecting the second set of firewall rules in the network environment, wherein the injecting includes associating each firewall rule in the second set of firewall rules with specific network identifiers and a corresponding zone of origination.

Aspect 4. The method of any of Aspects 1 to 3, wherein each zone of origination represents distinct network segments or domains within the network environment, facilitating an identification of one or more correlations between zones of origination of the firewall data associated with each network identifier received at the firewall Aspect 5. The method of any of Aspects 1 to 4, wherein each network identifier identifies a source network appliance and destination network appliance of each network identifier that is associated with the generated first set of firewall rules.

Aspect 6. The method of any of Aspects 1 to 5, further comprising: automatically modifying the first set of firewall rules, to remove one or more of firewall rules in the first set of firewall rules to generate the second set of firewall rules based on real-time network activity and threat intelligence data received at the firewall.

Aspect 7. The method of any of Aspects 1 to 6, further comprising: monitoring the network traffic patterns to detect when incoming or outgoing network traffic matches one or more conditions specified in one or more firewall rules from the first set of firewall rules; generating an invocation event upon detection of said matching network traffic, the invocation event configured to trigger an automatic modification of the first set of firewall rules.

Aspect 8. The method of any of Aspects 1 to 7, wherein the exported data received from network appliances in the network environment comprises network identifiers selected from the group consisting of MAC addresses, IP addresses, domain names, hostnames, and port numbers.

Aspect 9. A network device comprising: one or more memories having computer-readable instructions stored therein; and one or more processors configured to execute the computer-readable instructions to: obtain network traffic patterns including data exported from one or more network appliances in a network environment, wherein the data includes a plurality of network identifiers; automatically generate a first set of firewall rules based on a source and destination of each network identifier; automatically generate a second set of firewall rules based on firewall data including a source and destination of address; and generate a revised set of firewall rules based on the first set of firewall rules and the second set of firewall rules, wherein the revised set of firewall rules is also based on a detection of a number of times at least one of the second set of rules is invoked at the firewall.

Aspect 10. The network device of Aspect 9, wherein generating the second set of firewall rules includes automatically modifying or removing existing firewall rules in the first set of firewall rules based on real-time network activity and threat intelligence data at the firewall.

Aspect 11. The network device of any of Aspects 9 to 10, further comprising: injecting the second set of firewall rules in the network environment, wherein the injecting includes associating each firewall rule in the second set of firewall rules with specific network identifiers and a corresponding zone of origination.

Aspect 12. The network device of any of Aspects 9 to 11, wherein each zone of origination represents distinct network segments or domains within the network environment, facilitating an identification of one or more correlations between zones of origination of the firewall data associated with each network identifier received at the firewall.

Aspect 13. The network device of any of Aspects 9 to 12, wherein each network identifier identifies a source network appliance and destination network appliance of each network identifier that is associated with the generated first set of firewall rules.

Aspect 14. The network device of any of Aspects 9 to 13, further comprising: automatically modifying the first set of firewall rules, to remove one or more of firewall rules in the first set of firewall rules to generate the second set of firewall rules based on real-time network activity and threat intelligence data received at the firewall.

Aspect 15. The network device of any of Aspects 9 to 14, further comprising: monitoring the network traffic patterns to detect when incoming or outgoing network traffic matches one or more conditions specified in one or more firewall rules from the first set of firewall rules; generating an invocation event upon detection of said matching network traffic, the invocation event configured to trigger an automatic modification of the first set of firewall rules.

Aspect 16. The network device of any of Aspects 9 to 15, wherein the exported data received from network appliances in the network environment comprises network identifiers selected from the group consisting of MAC addresses, IP addresses, domain names, hostnames, and port numbers.

Aspect 17. A non-transitory computer-readable storage medium comprising computer-readable instructions, which when executed by one or more processors of a network appliance, cause the network appliance to: obtain network traffic patterns including data exported from one or more network appliances in a network environment, wherein the data includes a plurality of network identifiers; automatically generate a first set of firewall rules based on a source and destination of each network identifier; automatically generate a second set of firewall rules based on firewall data including a source and destination of address; and generate a revised set of firewall rules based on the first set of firewall rules and the second set of firewall rules, wherein the revised set of firewall rules is also based on a detection of a number of times at least one of the second set of rules is invoked at the firewall.

Aspect 18. The non-transitory computer-readable storage medium of Aspect 17, wherein generating the second set of firewall rules includes automatically modifying or removing existing firewall rules in the first set of firewall rules based on real-time network activity and threat intelligence data at the firewall.

Aspect 19. The non-transitory computer-readable storage medium of any of Aspects 17 to 18, wherein the one or more processors are further configured to: inject the second set of firewall rules in the network environment, wherein the injecting includes associating each firewall rule in the second set of firewall rules with specific network identifiers and a corresponding zone of origination.

Aspect 20. The non-transitory computer-readable storage medium of any of Aspects 17 to 19, wherein each zone of origination represents distinct network segments or domains within the network environment, facilitating an identification of one or more correlations between zones of origination of the firewall data associated with each network identifier received at the firewall.

Aspect 21. The non-transitory computer-readable storage medium of any of Aspects 17 to 20, wherein each network identifier identifies a source network appliance and destination network appliance of each network identifier that is associated with the generated first set of firewall rules.

Aspect 22. The non-transitory computer-readable storage medium of any of Aspects 17 to 21, wherein the one or more processors are further configured to: automatically modify the first set of firewall rules, to remove one or more of firewall rules in the first set of firewall rules to generate the second set of firewall rules based on real-time network activity and threat intelligence data received at the firewall.

Aspect 23. The non-transitory computer-readable storage medium of any of Aspects 17 to 22, wherein the one or more processors are further configured to: monitor the network traffic patterns to detect when incoming or outgoing network traffic matches one or more conditions specified in one or more firewall rules from the first set of firewall rules; generate an invocation event upon detection of said matching network traffic, the invocation event configured to trigger an automatic modification of the first set of firewall rules.

Aspect 24. The non-transitory computer-readable storage medium of any of Aspects 17 to 23, wherein the exported data received from network appliances in the network environment comprises network identifiers selected from the group consisting of MAC addresses, IP addresses, domain names, hostnames, and port numbers.

What is claimed is:

1. A method for automated creation and management of firewall rules in a network environment, comprising:

obtaining network traffic patterns including data exported from one or more network appliances in the network environment, wherein the data includes a plurality of network identifiers;

generalizing the network traffic patterns into a communication flow matrix that aggregates individual flows into subnet-level representations;

correlating each generalized communication flow with a corresponding zone of origination representing distinct network segments or domains within the network environment;

automatically generating a first set of firewall rules based on a source and destination of each network identifier;

automatically generating a second set of firewall rules based on firewall data including a source and destination address;

injecting the second set of firewall rules into the network environment by associating each firewall rule with the specific network identifiers and the corresponding zone of origination; and generating a revised set of firewall rules based on the first set of firewall rules and the second set of firewall rules, wherein the revised set of firewall rules is also based on a detection of a number of times at least one of the second set of firewall rules is invoked at a firewall.

2. The method of claim 1, wherein generating the second set of firewall rules includes automatically modifying or removing existing firewall rules in the first set of firewall rules based on real-time network activity and threat intelligence data at the firewall.

3. The method of claim 1, wherein the injecting the second set of firewall rules in the network environment includes associating each firewall rule in the second set of firewall rules with specific network identifiers and a corresponding zone of origination.

4. The method of claim 3, wherein each zone of origination represents distinct network segments or domains within the network environment, facilitating an identification of one or more correlations between zones of origination of the firewall data associated with each network identifier received at the firewall.

5. The method of claim 1, wherein each network identifier identifies a source network appliance and destination network appliance of each network identifier that is associated with the generated first set of firewall rules.

6. The method of claim 1, further comprising:

automatically modifying the first set of firewall rules, to remove one or more of firewall rules in the first set of firewall rules to generate the second set of firewall rules based on real-time network activity and threat intelligence data received at the firewall.

7. The method of claim 1, further comprising:

monitoring the network traffic patterns to detect when incoming or outgoing network traffic matches one or more conditions specified in one or more firewall rules from the first set of firewall rules; and generating an invocation event upon detection of the matching network traffic, the invocation event configured to trigger an automatic modification of the first set of firewall rules.

8. A network device comprising:

one or more memories having computer-readable instructions stored therein;

one or more processors configured to execute the computer-readable instructions to:

obtain network traffic patterns including data exported from one or more network appliances in a network environment, wherein the data includes a plurality of network identifiers;

generalize the network traffic patterns into a communication flow matrix that aggregates individual flows into subnet-level representations;

correlate each generalized communication flow with a corresponding zone of origination representing distinct network segments or domains within the network environment;

automatically generate a first set of firewall rules based on a source and destination of each network identifier;

automatically generate a second set of firewall rules based on firewall data including a source and destination address;

inject the second set of firewall rules into the network environment by associating each firewall rule with the specific network identifiers and the corresponding zone of origination; and generate a revised set of firewall rules based on the first set of firewall rules and the second set of firewall rules, wherein the revised set of firewall rules is also based on a detection of a number of times at least one of the second set of firewall rules is invoked at a firewall.

9. The network device of claim 8, wherein generating the second set of firewall rules includes automatically modifying or removing existing firewall rules in the first set of firewall rules based on real-time network activity and threat intelligence data at a firewall.

10. The network device of claim 8, wherein the injecting the second set of firewall rules in the network environment includes associating each firewall rule in the second set of firewall rules with specific network identifiers and a corresponding zone of origination.

11. The network device of claim 10, wherein each zone of origination represents distinct network segments or domains within the network environment, facilitating an identification of one or more correlations between zones of origination of the firewall data associated with each network identifier received at the firewall.

12. The network device of claim 8, wherein each network identifier identifies a source network appliance and destination network appliance of each network identifier that is associated with the generated first set of firewall rules.

13. The network device of claim 8, further comprising: automatically modifying the first set of firewall rules, to remove one or more of firewall rules in the first set of firewall rules to generate the second set of firewall rules based on real-time network activity and threat intelligence data received at the firewall.

14. The network device of claim 8, further comprising: monitoring the network traffic patterns to detect when incoming or outgoing network traffic matches one or more conditions specified in one or more firewall rules from the first set of firewall rules; and generating an invocation event upon detection of said matching network traffic, the invocation event configured to trigger an automatic modification of the first set of firewall rules.

15. A non-transitory computer-readable storage medium comprising computer-readable instructions, which when executed by one or more processors of a network appliance, cause the network appliance to:

obtain network traffic patterns including data exported from one or more network appliances in a network environment, wherein the data includes a plurality of network identifiers;

generalize the network traffic patterns into a communication flow matrix that aggregates individual flows into subnet-level representations;

correlate each generalized communication flow with a corresponding zone of origination representing distinct network segments or domains within the network environment;

automatically generate a first set of firewall rules based on a source and destination of each network identifier;

automatically generate a second set of firewall rules based on firewall data including a source and destination address;

inject the second set of firewall rules into the network environment by associating each firewall rule with the specific network identifiers and the corresponding zone of origination; and generate a revised set of firewall rules based on the first set of firewall rules and the second set of firewall rules, wherein the revised set of firewall rules is also based on a detection of a number of times at least one of the second set of firewall rules is invoked at a firewall.

16. The non-transitory computer-readable storage medium of claim 15, wherein the injecting the second set of firewall rules in the network environment includes associating each firewall rule in the second set of firewall rules with specific network identifiers and a corresponding zone of origination.

17. The non-transitory computer-readable storage medium of claim 16, wherein each zone of origination represents distinct network segments or domains within the network environment, facilitating an identification of one or more correlations between zones of origination of the firewall data associated with each network identifier received at the firewall.

18. The non-transitory computer-readable storage medium of claim 15, wherein the one or more processors are further configured to:

automatically modify the first set of firewall rules, to remove one or more of firewall rules in the first set of firewall rules to generate the second set of firewall rules based on real-time network activity and threat intelligence data received at the firewall.

19. The non-transitory computer-readable storage medium of claim 15, wherein the one or more processors are further configured to:

monitor the network traffic patterns to detect when incoming or outgoing network traffic matches one or more conditions specified in one or more firewall rules from the first set of firewall rules; and generate an invocation event upon detection of said matching network traffic, the invocation event configured to trigger an automatic modification of the first set of firewall rules.

20. The non-transitory computer-readable storage medium of claim 15, wherein the exported data received from network appliances in the network environment comprises network identifiers selected from the group consisting of MAC addresses, IP addresses, domain names, hostnames, and port numbers.

* * * * *